(12) United States Patent
Olsen

(10) Patent No.: US 10,492,644 B2
(45) Date of Patent: Dec. 3, 2019

(54) BARBECUE GRILL CART

(71) Applicant: Landmann USA, Fairburn, GA (US)

(72) Inventor: Tom Olsen, Fairburn, GA (US)

(73) Assignee: LANDMANN USA, Fairburn, GA (US)

( * ) Notice: Subject to any disclaimer, the term of this patent is extended or adjusted under 35 U.S.C. 154(b) by 356 days.

(21) Appl. No.: 15/359,637

(22) Filed: Nov. 23, 2016

(65) Prior Publication Data

US 2017/0143162 A1 May 25, 2017

Related U.S. Application Data

(60) Provisional application No. 62/258,665, filed on Nov. 23, 2015.

(51) Int. Cl.
*A47J 37/07* (2006.01)

(52) U.S. Cl.
CPC ........... *A47J 37/0786* (2013.01); *A47J 37/07* (2013.01)

(58) Field of Classification Search
CPC ........ A47J 37/0786; A47J 37/07; F24C 15/08
See application file for complete search history.

(56) References Cited

U.S. PATENT DOCUMENTS

| 5,076,252 A | * | 12/1991 | Schlosser | ............ | A47J 37/0713 |
| | | | | | 126/25 R |
| 6,694,967 B2 | * | 2/2004 | Stephen | ............. | A47J 37/0786 |
| | | | | | 126/276 |

* cited by examiner

*Primary Examiner* — Alfred Basichas
(74) *Attorney, Agent, or Firm* — McClure, Qualey & Rodack, LLP

(57) ABSTRACT

A barbecue grill cart is disclosed, the cart having a shelf for supporting an LP gas tank in an elevated position. An opening is provided over the LP tank for allowing access thereto. The cart also includes a shallow cabinet for holding grilling tools and one or more wide drawers for storage.

10 Claims, 8 Drawing Sheets

BARBECUE GRILL CART

CROSS-REFERENCE TO RELATED APPLICATION

This application claims the benefit of U.S. Provisional Application 62/258,665, filed Nov. 23, 2015, which is incorporated herein in its entirety.

BACKGROUND

Barbecue grills often are fueled by liquid propane (LP) gas supplied from a portable tank. The tank is refillable and when empty, is removed from its cart mounting and either refilled or replaced. When mounted on the cart, the tank is normally secured against movement by screws, bolts, straps, and other means. The securing means maintain the tank in an upright position for use and are released for transporting the tank to a refilling or replacement facility.

The tank is normally mounted on the bottom shelf or a bottom strut of the cart frame. One of the reasons for this mounting is that a full LP gas tank is relatively heavy and a bottom mount requires less lifting of the tank. Another reason is to maintain some distance between the tank and the grill itself, the spacing serving as a heat shield. This positioning makes access to the tank difficult as the user must bend down or squat down to secure the tank, access the on-off valve and regulator, and inspect the tank for leaks. It is to these difficulties that the present disclosure is addressed.

SUMMARY

The present disclosure addresses a need that has existed since barbecue grills were first mounted on carts or even stationary arrangements like outdoor kitchens. Structure is provided to mount the tank in an elevated position for ease of access. The tank is supported at approximately waist-level on a shelf, strut, or other mounting surface. The mounting surface may be stationary or can be slidable laterally and/or vertically to move the tank away from the confines of the grill cart or outdoor kitchen structure. The cart or kitchen structure is configured to allow access to the tank securing means, on-off valve, and gas regulator.

The elevated mounting provides ancillary benefits, in addition to ease of access, as proper practice with LP gas tanks is to turn off the gas valve after using the tank and to check the tank for leaks prior to use. These activities may be ignored or overlooked due to the difficulty involved in accessing the tank. These tasks are made significantly easier with the assembly disclosed herein.

Various additional objects and advantages of the present elevated mounting assembly will become apparent with reference to the attached drawings and specification.

DETAILED DESCRIPTION

Figure 1:
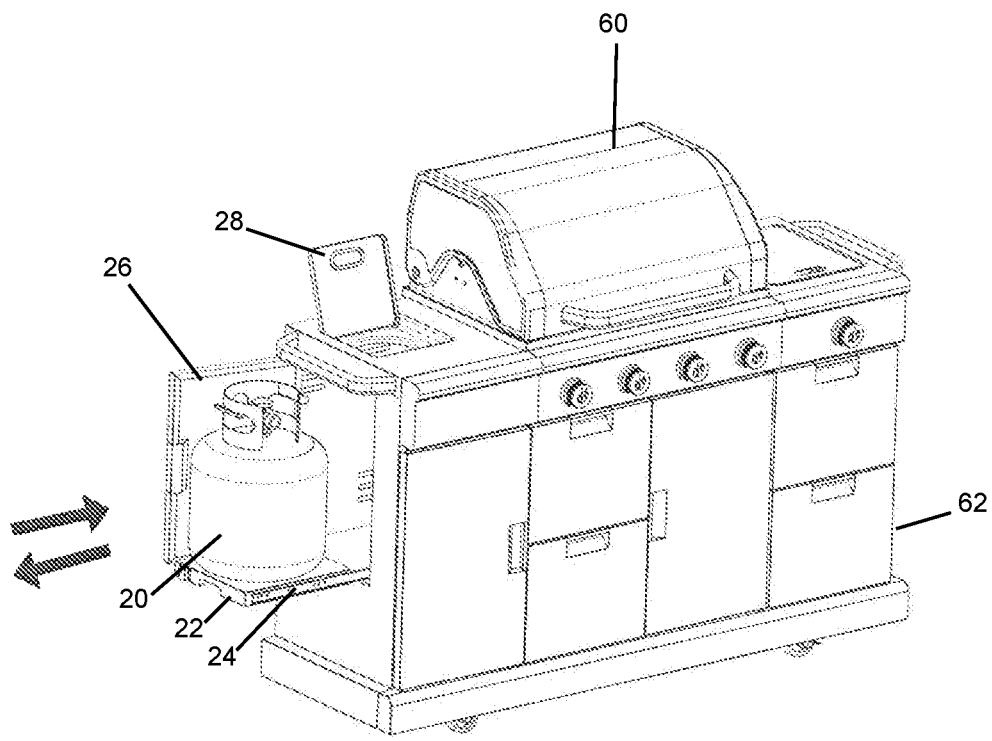
FIG. 1 is a perspective view of the new barbecue grill cart, illustrating tank mounting from one side.

As shown in the drawings, an elevated mounting assembly is provided for an LP tank, shown associated with a barbecue grill and cart assembly. The present device can also be used for stationary grills and for any other appliance or structure where an LP tank is utilized.

The tank supporting shelf can be fixed or slidable and includes securing means to hold the tank in place on the shelf. The tank can be exposed or in a cabinet-type enclosure. Access to the tank can be from the front, side, or rear of the cart. The tank can also be accessible from above, for ease of turning the gas valve on or off, and for connecting or disconnecting the tank from the regulator and gas supply conduit.

The shelf that supports the tank may also be capable of movement in a vertical direction, with appropriate supporting hardware and mechanisms for operation.

Appropriate shielding is employed on the cart to protect the LP tank from heat generated in the firebox. The cart structure may also include means to weigh the tank, as an indication of the fuel level therein.

Figure 2:
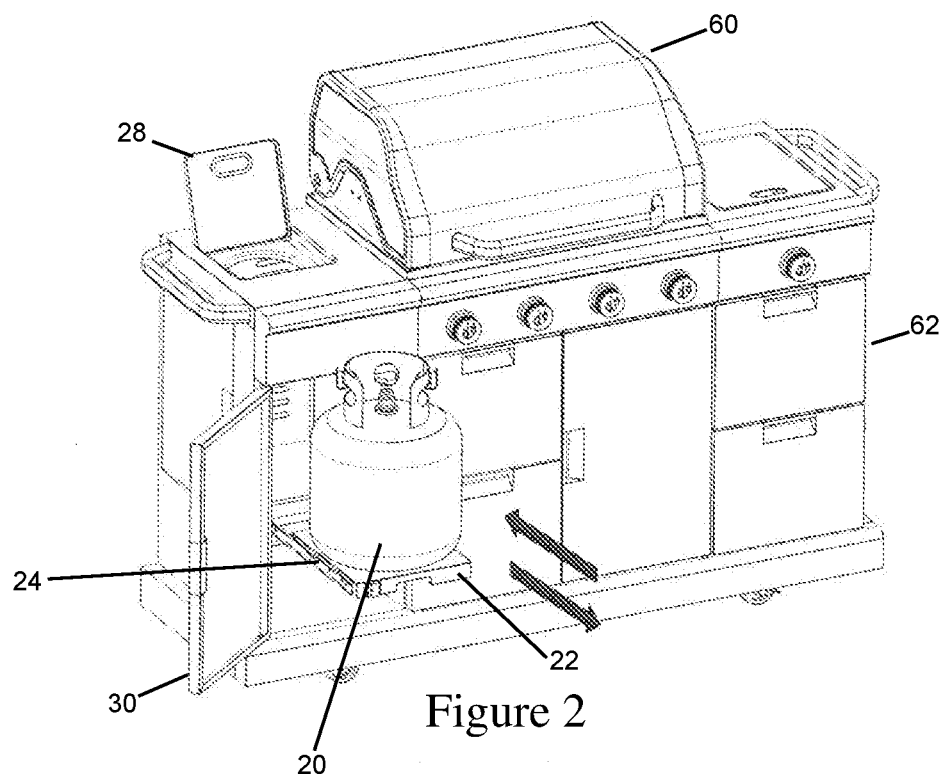
FIG. 2 is a perspective view of the grill cart showing the tank being mounted from the front.
Figure 3:
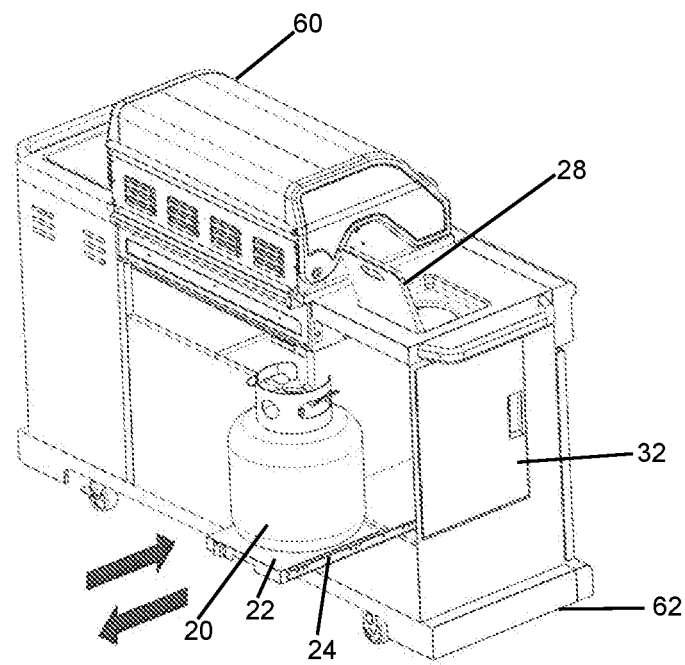
FIG. 3 is a perspective view of the cart with the tank shown mounted from the back.

FIGS. 1-3 illustrate that the tank can be mounted in the cart from the side, front, or rear of the cart. The tank mounting shelves can be laterally slidable or they can be fixed in place. Once mounted, appropriate securing means are used to secure the tank against movement. Additional securing means can be employed to prevent the mounting shelf from unwanted movement. The cart itself is a generally rectangular structure having four legs, linear rails connecting the legs, and a support structure to mount and secure a barbecue grill thereto. The cart may include wheels or casters 15 for portability and one or more shelf spaces around the grill.

The barbecue grill is conventional and includes a lower firebox with one or more burners mounted therein. The firebox is covered with a lid that can be opened and closed. Liquid propane (LP) or natural gas is used as fuel for the gas burner(s).

FIG. 1 illustrates an embodiment of a barbecue grill cart showing a conventional barbecue grill 60 mounted on cart 62. The cart is provided with an LP gas tank 20. The tank is mounted on a movable shelf 22 supported by struts 24. The struts extend into the interior of the grill cart structure and the shelf can be slid in and out as depicted by the arrows. An access door 26 is provided at the side of the cart, the door being capable of being opened and closed to permit or deny access to the LP tank. Once installed, access to the top of the tank, the on/off valve, and the LP gas regulator and hose is provided through top access door 28. As noted hereinabove, the access to the top of the LP tank is provided at approximately waist level, thereby facilitating the ability to turn the gas supply on or off and to check the regulator and hose for leaks.

FIG. 2 illustrates an alternate embodiment of the present grill cart in which the LP tank 20 is installed and/or removed from the front of the cart. In this embodiment, shelf 22 is supported by rails 24 and the shelf is slidable laterally into or out of the cart structure as designated by the arrows. The top of the LP tank is accessed through the top access door 28. Once installed, door 30 can be opened or closed to allow or deny access to the LP tank.

Another embodiment of the present cart is shown in FIG. 3. In this embodiment, the shelf 22 is supported by struts 24 and the shelf is slidable laterally into the cart structure and out of the cart structure from the rear of the cart. The LP tank is accessible through top access door 28. Once installed in the cart, door 32 is used to either allow or deny access to the tank.

Figure 4:
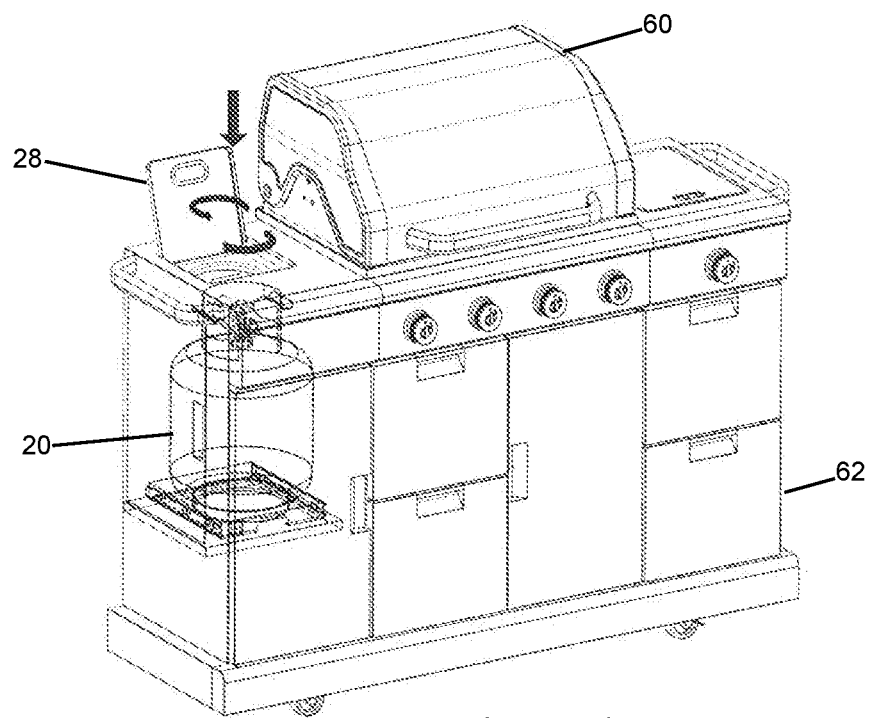
FIG. 4 is a perspective view, shown partially in cross-section, showing the tank in place and illustrating the access to the tank from the top.

FIG. 4 shows the LP tank 20 in its installed position on the grill cart. From the installed position, top access door 28 is opened or closed to allow or prevent access to the top of the LP gas tank.

Figure 5:
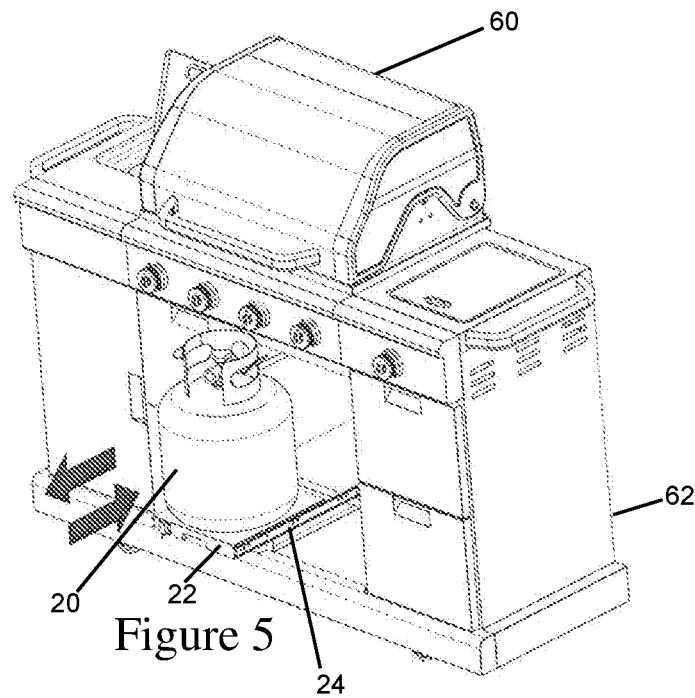
FIG. 5 is a perspective view of the cart showing the tank being mounted in the front center.
Figure 6:
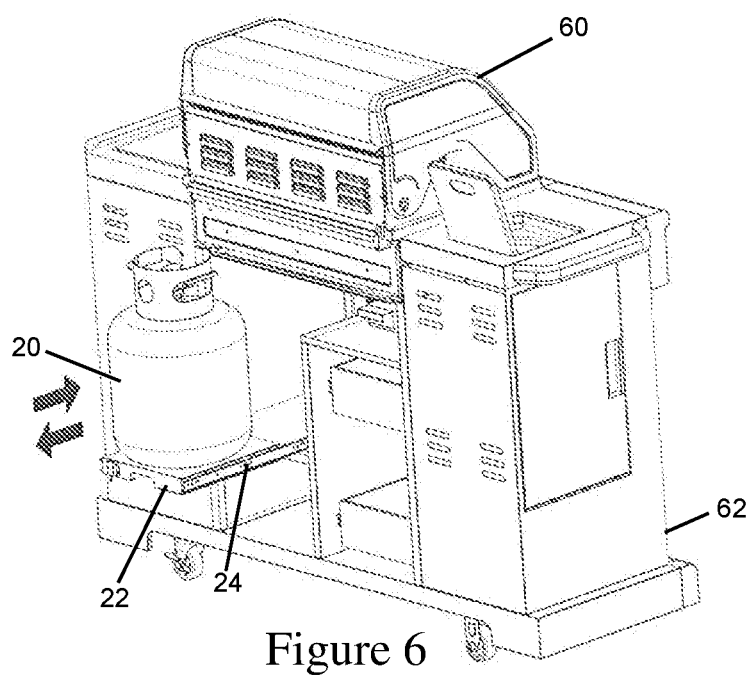
FIG. 6 is a perspective view of the cart showing the tank mounted from the rear center.

FIGS. 5 and 6 show two more embodiments of the present grill cart. In FIG. 5, the shelf 22 is mounted on struts 24 and is slidable laterally into or out of the cart structure. The embodiment of FIG. 6 shows the shelf 22 mounted on struts 24, the shelf being slidable into or out of the cart structure as depicted by the arrows.

Figure 7:
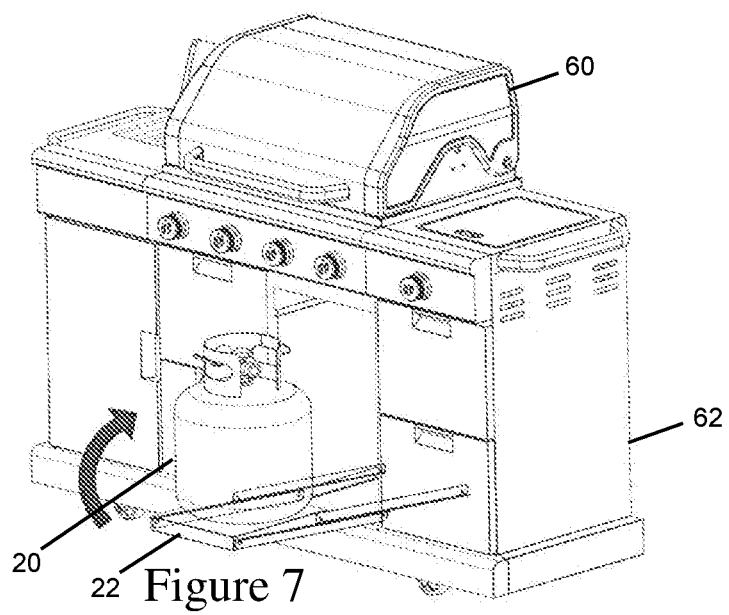
FIG. 7 is a perspective view showing the tank mounted in the front center with the mounting shelf being movable between lower and upper positions.

FIG. 7 shows an alternate embodiment of the cart structure shown in FIG. 5. In this embodiment, the struts 24 which support the shelf 22 are movable in a lateral direction and also in a vertical direction. This allows the tank to be mounted while the shelf is in a lower position and then raised as it is installed into the grill cart.

Figure 8:
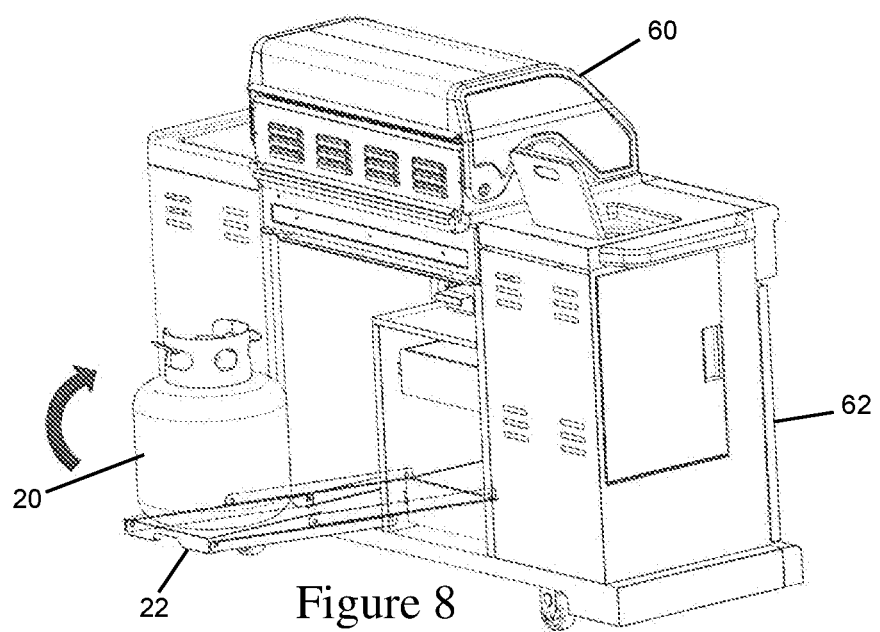
FIG. 8 is a perspective view of the grill cart with the tank being mounted in the rear center, the shelf being capable of being raised from a lower to an upper position.

FIG. 8 is an embodiment similar to that of FIG. 6. In this embodiment; however, the shelf 22 is movable laterally into and out of the cart structure and also can be raised or lowered, as indicated by the arrow.

Figure 9:
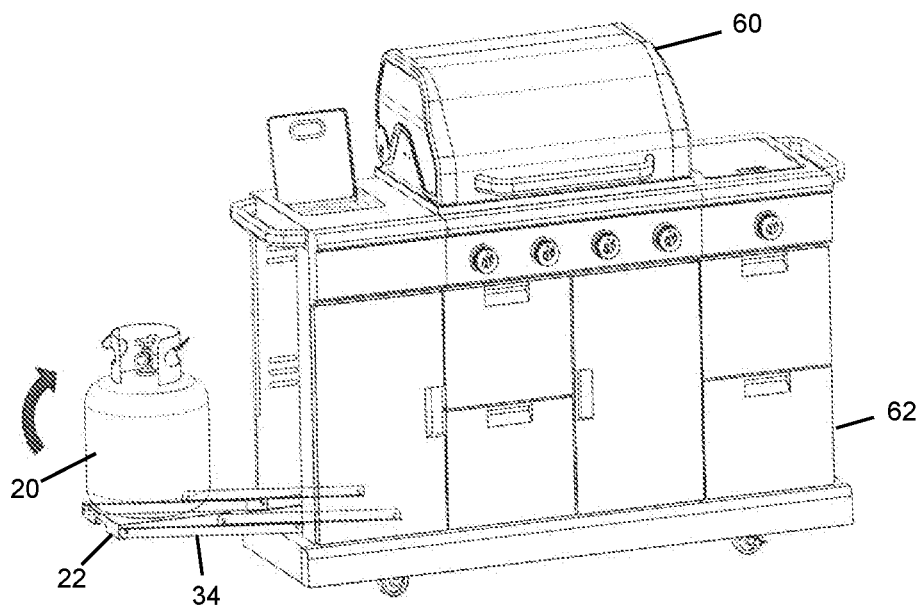
FIG. 9 is a perspective view of the cart showing the tank being mounted from one side, with the shelf being capable of being raised and lowered.
Figure 10:
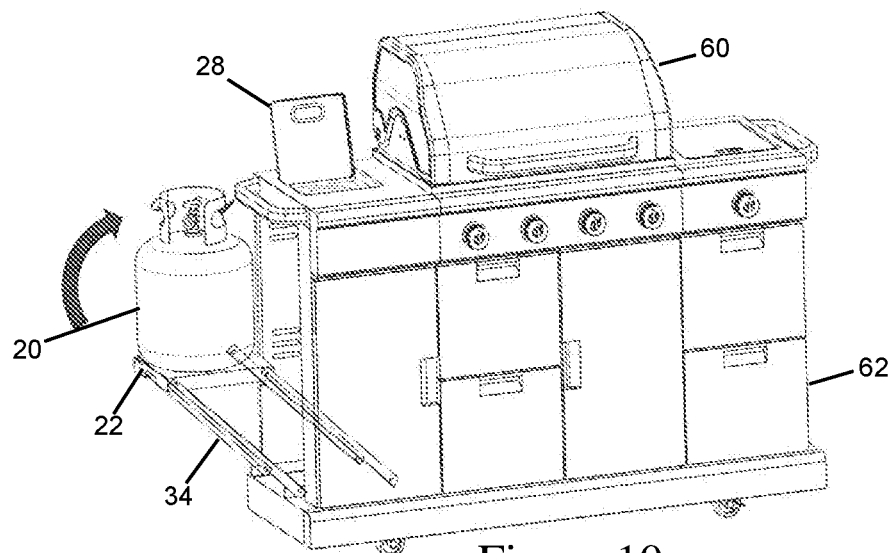
FIG. 10 is a perspective view similar to FIG. 9 showing the tank in a raised position.

FIGS. 9 and 10 illustrate another embodiment of the present cart structure. Here, the LP tank 20 is mounted on shelf 22 and supported by struts 34. Struts 34 are constructed to move the shelf both laterally and vertically so that the tank may be placed on the shelf in a position relatively close to the ground as shown in FIG. 9 and then raised into operative position as shown in FIG. 10 as the struts 34 are movable vertically to raise the tank from the mounting position shown in FIG. 9. Once installed in the tank, the top of the LP tank can be accessed through top access door 28.

Figure 11:
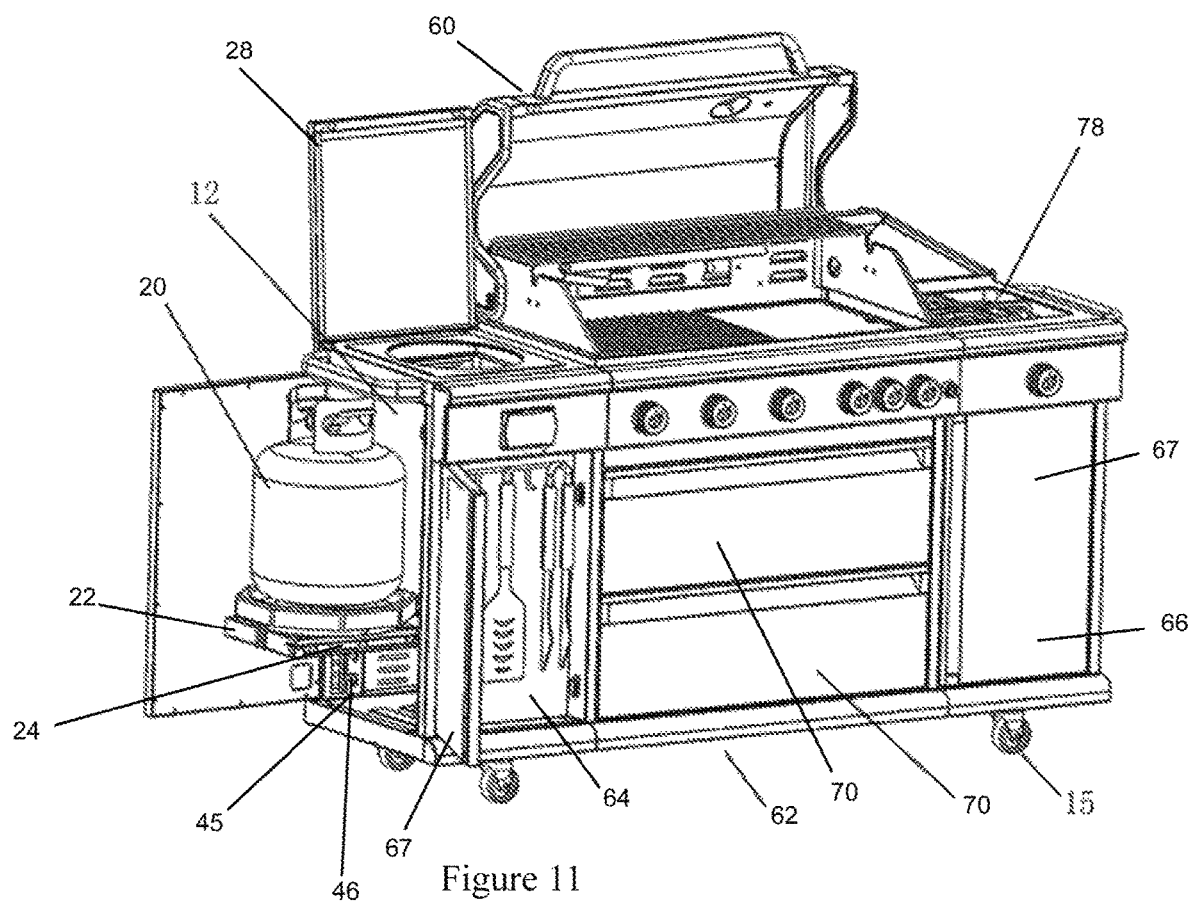
FIG. 11 is a perspective view of an alternate embodiment of the present cart, showing the tank being mounted from one side and illustrating the tool cabinet.
Figure 12:
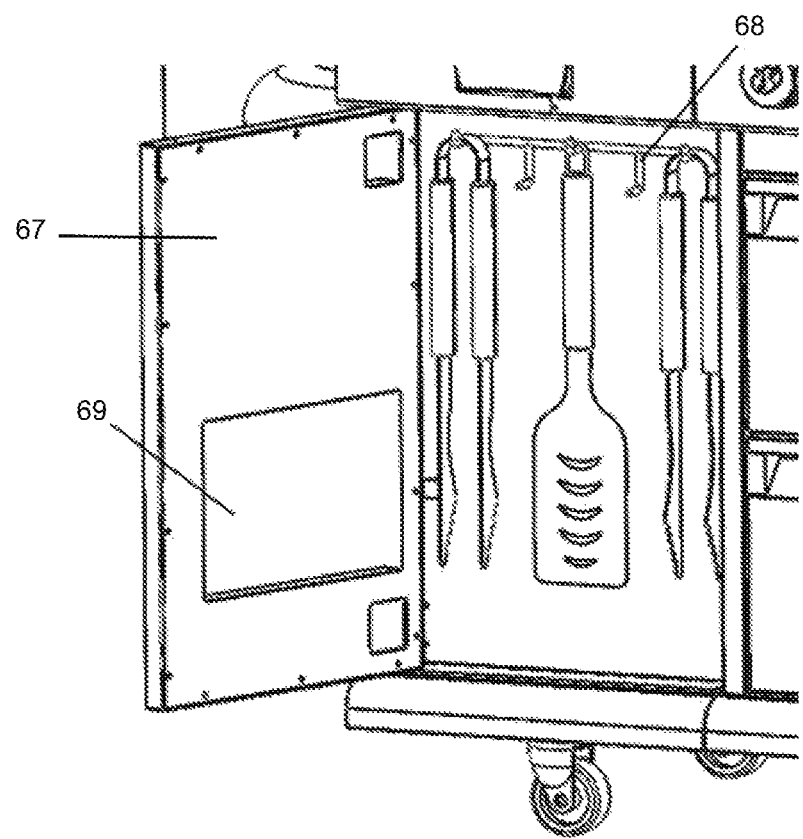
FIG. 12 is an enlarged partial perspective view showing the tool cabinet.
Figure 13:
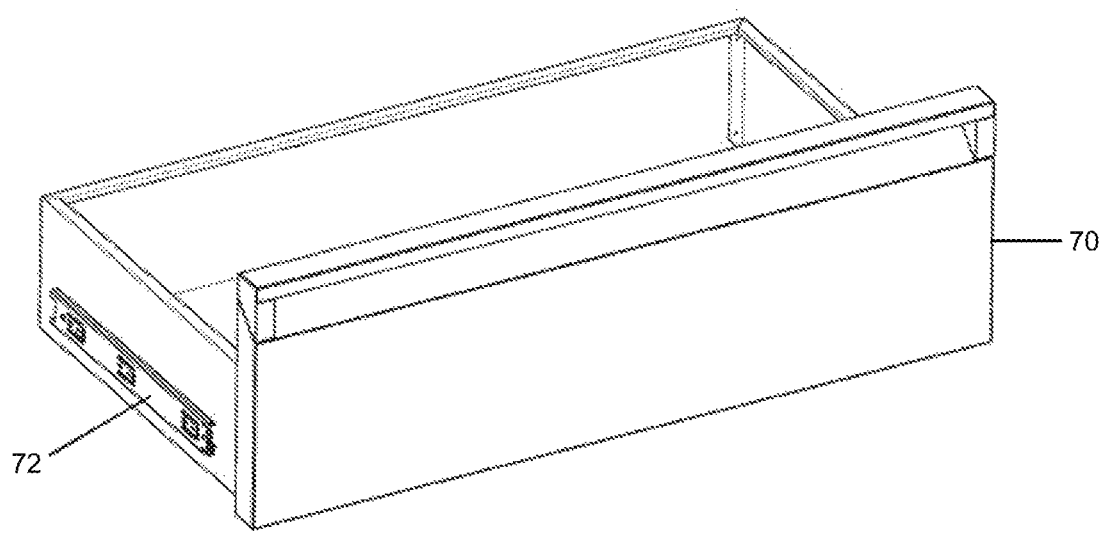
FIG. 13 is a perspective view showing a grill cart cabinet drawer.

FIG. 11 shows another embodiment of the present grill cart. The barbecue grill 60 is conventional in design and will not be further described. The grill cart 62 includes vertically elongated cabinets 64 and 66 located in the front face of the cart. Cabinet 64 has a relatively shallow depth and is equipped with hooks 68, or a similar support means, such as posts, for suspending various grilling tools, as shown in FIGS. 11 and 12. The cart may include a second vertically elongated cabinet 66 on the opposite end which may be configured similarly to cabinet 64, or it can be of normal depth and simply used for storage. The tool cabinet or cabinets can be located in any position across the front or even across the back of the cart, such being facilitated by the shallow depth. Both side cabinets have access doors 67. The doors include a recess 69 to allow room to fit larger than standard grilling tools, cleaning brushes, and the like.

In the embodiment shown in FIG. 11, with the vertical cabinets 64 and 66 on the outer ends, a horizontally elongated drawer or drawers 70 are disposed in the middle of the cart. These cabinets have relatively broad depths, due to the fact that the LP tank is disposed at one end of the cart or the other end. These drawers can be used for storage and can also be insulated for temporary storage of cold items or for items to be later cooked on the grill. The drawers have supporting rails 72 that interact with struts in the grill cart cabinet.

Figure 14:
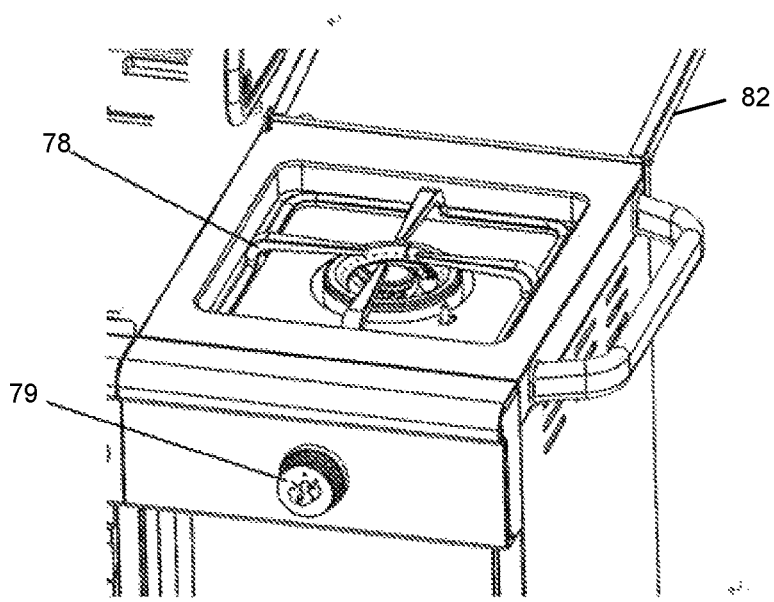
FIG. 14 is a partial enlarged perspective view showing a side burner mounted on the cart.

FIG. 14 illustrates a dual-ring side burner 78. The side burner is connected to the gas supply and operated with control knob 79. Cover 82 is provided to allow or prevent access to the side burner. With the cover closed, the top of the cover provides a convenient shelf.

Referring back to FIG. 11, the tank is stored in housing 12 and the shelf 22 is movable laterally and vertically. The shelf can be lowered to a level close to the bottom of the cart for loading or unloading the tank. The shelf can then be moved vertically along tracks 45. The tracks 45 have apertures 46 that interact with spring-loaded rods to position the shelf at a desired height. Vertical movement can be effected manually or mechanically using springs, hydraulics, motors, or another expedient to position the top of the tank near the top of the cart structure to provide convenient access to the top of the LP tank, the on-off valve, and the hoses and regulator. Stops are provided at regular intervals to lock the shelf in the desired position.

As shown in the drawings, with the tank in installed position in the cart, the connections between the tank and the LP gas regulator, which serves as the means to meter gas flow to the burners, are located conveniently at approximately waist-level. As shown, the side shelf over the tank includes an access door through which a user can connect or disconnect the gas tank from the regulator and hoses. The user can also easily turn the gas supply valve on or off. This arrangement is an important safety feature as LP tanks which are not in use should have the gas valve closed until a subsequent use.

While an embodiment of an elevated mounting assembly for LP gas tanks or carts or other kitchen structures has been shown and described herein, various additional embodiments and modifications thereof are possible and are meant to be included within the scope of the present disclosure.

I claim:

1. A barbecue grill cart with a top and bottom for supporting a barbecue grill and for receiving an LP gas supply tank mountable within a storage area of the cart, the barbecue grill cart comprising:
   a horizontally-oriented shelf having an upper surface configured to support the LP tank, said shelf being spaced from the bottom of the cart and disposed at one side thereof, said shelf being movable between a stowed position and a non-stowed position, at which said shelf is laterally displaced from the storage area of the cart; and
   an access opening at the top of the cart disposed over the LP tank, when said shelf is in the stowed position, configured to allow access to the LP tank through said opening.

2. A barbecue grill cart as defined in claim 1 in which said cart includes a cover for said access opening.

3. A barbecue grill cart as defined in claim 2 in which said cart includes a vertically elongated tool cabinet.

4. A barbecue grill cart as defined in claim 1, wherein:
the cart further comprises a first extendable strut attached to a first side of the shelf and a second extendable strut attached to a second, opposing side of the shelf; and
wherein the shelf is moveable between the stowed and non-stowed positions via sliding movement of the first extendable strut and the second extendable strut.

5. A barbecue grill cart as defined in claim 1 in which said cart has a front and back with a shallow tool cabinet disposed in the front of the cart.

6. A barbecue grill cart assembly as defined in claim 5 in which said cabinet is vertically elongated.

7. A barbecue grill cart assembly as defined in claim 5 in which said cabinet includes at least one support means for suspending a grilling tool.

8. A barbecue grill cart as defined in claim 1 in which said shelf is vertically adjustable.

9. A barbecue grill cart as defined in claim 8, wherein:
the cart further comprises a first strut attached to a first side of the shelf and a second strut attached to a second, opposing side of the shelf; and
wherein the shelf is moveable between the stowed and non-stowed positions via pivotal movement of the first strut and the second strut.

10. A barbecue grill cart as defined in claim 8, wherein the shelf is spaced vertically above the base of the cart such that a top of the LP tank is disposed at approximately waist level when supported by the shelf.

* * * * *